United States Patent
Kadoma et al.

(10) Patent No.: US 7,509,034 B2
(45) Date of Patent: Mar. 24, 2009

(54) VAPOR PRODUCTION DEVICE AND COOKER WITH THE SAME

(75) Inventors: Tetsuya Kadoma, Sakai (JP); Keisuke Hara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/570,305

(22) PCT Filed: Aug. 31, 2004

(86) PCT No.: PCT/JP2004/012554

§ 371 (c)(1),
(2), (4) Date: Mar. 2, 2006

(87) PCT Pub. No.: WO2005/026614

PCT Pub. Date: Mar. 24, 2005

(65) Prior Publication Data

US 2006/0291828 A1     Dec. 28, 2006

(30) Foreign Application Priority Data

Sep. 10, 2003  (JP) ............................. 2003-318838

(51) Int. Cl.
  *A01G 13/06* (2006.01)
  *B01D 3/06* (2006.01)
(52) U.S. Cl. ...................................... 392/386; 392/399
(58) Field of Classification Search ................. 392/386, 392/399
  See application file for complete search history.

(56) References Cited

U.S. PATENT DOCUMENTS 3,809,374 A * 5/1974 Schossow .................... 261/130
3,854,468 A * 12/1974 Nozaki ........................ 126/113
3,873,806 A * 3/1975 Schossow .................... 392/402
4,287,407 A   9/1981 Treiber et al.

FOREIGN PATENT DOCUMENTS

JP   5-231604 A   9/1993
JP   10-253006 A  9/1998
KR   0141513      3/1999

* cited by examiner

*Primary Examiner*—Thor S Campbell
(74) *Attorney, Agent, or Firm*—Birch, Stewart, Kolasch & Birch, LLP (57) ABSTRACT

A steam generating apparatus 20 including: a vaporizing container 1; a heater 2 for heating the vaporizing container 1; a feed pump 5 for feeding water from a reservoir tank 7 into the vaporizing container 1; a drain valve 6 for draining water out of the vaporizing container 1 through a drain pipe 8; a temperature detecting means 9 for detecting temperature of the vaporizing container 1; and a controller 10 for controlling the heater 2, the feed pump 5, the drain valve 6, and the like. After completion of steam generating operation, water remaining inside the vaporizing container 1 is drained after the temperature of the vaporizing container 1 has lowered to 60° C.

9 Claims, 8 Drawing Sheets

VAPOR PRODUCTION DEVICE AND COOKER WITH THE SAME

TECHNICAL FIELD

The present invention relates to a steam generating apparatus that heats and humidifies a heating target by using steam. The present invention also relates to a heating cooker incorporating such a steam generating apparatus.

BACKGROUND ART

Conventionally, a steam generating apparatus that uses steam and that is designed for use in a humidifying air conditioner or a humidifying cooker is so constructed as to supply steam in the following manner: water fed from a reservoir tank is vaporized in a vaporizing container heated with a heater or the like.

In such a steam generating apparatus, as time passes, substances, such as calcium, dissolved in the water fed from the reservoir tank are condensed inside the vaporizing container until eventually, when their concentrations become higher than their solubility, they are deposited in the form of scale. This may clog the steam outlet, or may attach to the interior wall surface of the vaporizing container, leading to diminished vaporizing performance.

Patent Publication 1 listed below discloses, with a view to overcoming such clogging and diminishing of vaporizing performance due to scale, a construction in which the water left in the vaporizing container is drained out of it and the vaporizing container is then heated and boiled with no water in it (empty-boiled) for a predetermined length of time. This permits the scale to be forcibly removed from the vaporizing container thanks to the difference in thermal expansion coefficient between them.

Patent Publication 1: Japanese Patent Application Laid-Open No. H5-231604

DISCLOSURE OF THE INVENTION

Problems to be Solved by the Invention

The conventional construction mentioned above requires empty-boiling for a predetermined length of time, resulting in extra consumption of energy. Moreover, since water remains evenly attached to the wall surface of the vaporizing container after it has been drained, when the vaporizing container is empty-boiled, the water attached thereto is dried at high temperature. Drying water at high temperature in this way causes the scale to crystallize to form hard, layered scale, which firmly attaches to the vaporizing container. Even if removed by exploiting the difference in thermal expansion coefficient, this layered scale is hard and thus forms large fragments, which are likely to clog the drain pipe or the drain valve and are difficult to remove. When clogging occurs, the steam generating apparatus cannot satisfactorily deliver its performance.

An object of the present invention is to provide a steam generating apparatus in which the scale attached to the inside of the vaporizing container is made to form small fragments and the crystal growth of the scale is minimized so that it attaches less firmly to the vaporizing container so as to be easily disposed of with a current of water.

Means for Solving the Problem

To achieve the above object, according to the present invention, a steam generating apparatus is provided with: a vaporizing container; heating means for heating the vaporizing container; water feeding means for feeding water into the vaporizing container; draining means for draining water out of the vaporizing container; temperature detecting means for detecting the temperature of the vaporizing container; controlling means for controlling the heating means, the water feeding means, the draining means, etc. Here, after the completion of steam generating operation, the water remaining inside the vaporizing container is drained after the temperature of the vaporizing container has lowered to a predetermined temperature.

In this construction, an ample amount of water is kept present inside the vaporizing container until its temperature has lowered to a predetermined temperature or less. Thus, water dries mainly on the surface of the water, and not on the wall surface. After the water is drained, the water that has attached to the wall surface of the vaporizing container starts to dry; here, the water dries below the predetermined temperature. This minimizes the growth of scale, and the scale that has already deposited readily comes off and collects in the bottom of the container when the apparatus is operated next time. The collected scale is removed when water is drained after the completion of operation.

The predetermined temperature is set at 60° C. or less. Drying water at a temperature higher than 60° C. greatly prompts the crystallization of scale. Thus, keeping an ample amount of water until the temperature lowers to 60° C. or less helps minimize the crystallization of scale.

Alternatively, control may be so performed that, immediately after the completion of heating, first the water remaining inside the vaporizing container is drained, and then water is fed into the vaporizing container. At the end of heating, the temperature of the water inside the vaporizing container is close to 100° C. Thus, first draining this hot water and then feeding ordinary-temperature water makes it possible to lower the temperature of the vaporizing container in a shorter time.

As described above, at the end of heating, the temperature of the vaporizing container is 100° C. or more, and the temperature of the water remaining inside the vaporizing container is close to 100° C. Thus, it takes time for these temperatures to lower to the predetermined temperature or less. By forcibly cooling the vaporizing container with a cooling fan, it is possible to further reduce the time required to reach the predetermined temperature.

In this case, a predetermined amount of water may be additionally fed into the vaporizing container. With this construction, thanks to the effect of the cooling fan combined with the additional feeding of ordinary-temperature water into the vaporizing container, it is possible to still further reduce the time required for the vaporizing container to reach the predetermined temperature.

ADVANTAGES OF THE INVENTION

In a steam generating apparatus according to the present invention, after the completion of steam generating operation, the vaporizing container is cooled so that water is drained after the temperature of the vaporizing container has lowered to a predetermined temperature. This permits the water left attached to the wall surface of the vaporizing container after it has been drained to dry below the predetermined temperature. This minimizes the crystallization of scale, allowing the scale to attach less firmly to the vaporizing container. Thus, the attached scale readily comes off and collects in the bottom of the container when the apparatus is operated next time. The collected scale is removed when water is drained after the completion of operation. In this way, it is possible to prevent clogging and the diminishing of vaporizing performance.

LIST OF REFERENCE SYMBOLS

1 Vaporizing Container
2 Heater
3 Steam Outlet
4 Feed/Drain Pipe
5 Feed Pump
7 Reservoir Tank
6 Drain Valve
8 Drain Pipe
9 Thermistor
10 Controller
11 Cooling Fan
12 Level Sensor
20 Steam Generating Apparatus

BEST MODE FOR CARRYING OUT THE INVENTION

Figure 1:
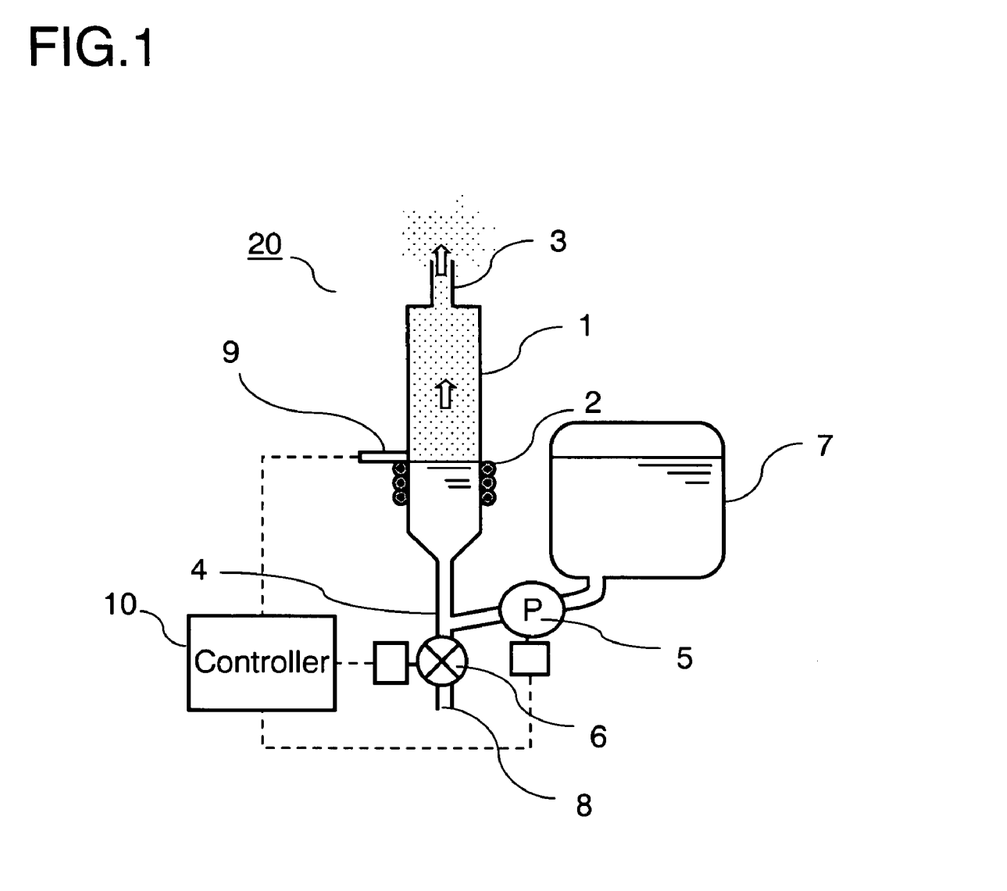
[FIG. 1] is an outline sectional view of the steam generating apparatus of a first embodiment of the invention.

A first embodiment of the present invention will be described below. FIG. 1 is an outline sectional view of the steam generating apparatus 20 of the first embodiment of the invention. A vaporizing container 1 has a heater 2 fitted around the outside thereof. The vaporizing container 1 is connected, at the top, to a steam outlet 3. The vaporizing container 1 is connected, at the bottom, to a feed/drain pipe 4 and then through a feed pump 5 to a reservoir tank 7. When the feed pump 5 is started, the water inside the reservoir tank 7 is fed through the feed/drain pipe 4 into the vaporizing container 1. The feed/drain pipe 4 is also connected to a drain pipe 8. When the drain valve 6 is opened, the water inside the vaporizing container 1 is drained out of it through the drain pipe 8. Near the heater 2, a thermistor 9 is provided as a temperature detecting means. A controller 10 monitors the temperature of the vaporizing container 1, and controls the operation of the feed pump 5. The drain valve 6 is realized with a solenoid- or motor-operated valve that can be opened and closed electrically. Thus, the controller 10 can also control the opening and closing of the drain valve 6.

Figure 2:
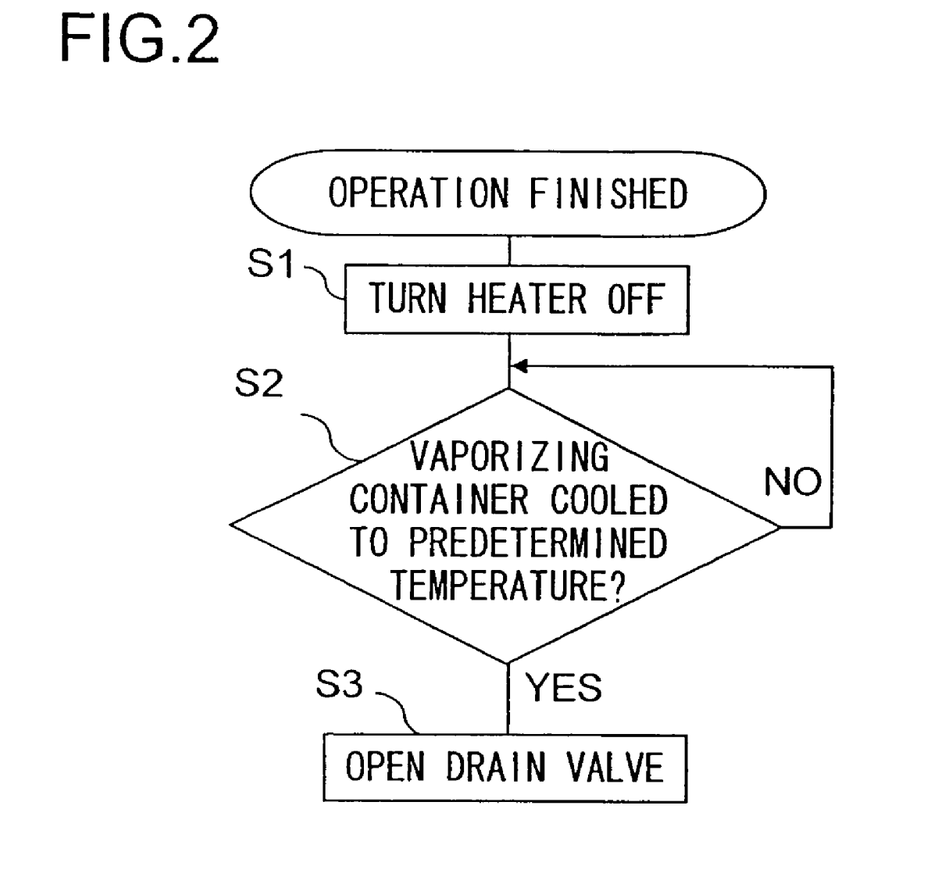
[FIG. 2] is a flow chart showing an example of the operation of the steam generating apparatus above.

Now, the operation of the steam generating apparatus 20 constructed as described above will be described with reference to the flow chart shown in FIG. 2. The water inside the vaporizing container 1 is heated and boiled by the heater 2. In the space in an upper portion of the container, steam is separated so as to be fed out through the steam outlet 3. On completion of the steam generating operation, the heater 2 is turned off (step S1), and the monitoring of the temperature of the vaporizing container 1 by the thermistor 9 is started (step S2). The state as it currently is, i.e., with an ample amount of water present inside the vaporizing container 1, is maintained until the temperature of the vaporizing container 1 lowers to a predetermined temperature. Next, when the thermistor 9 detects the predetermined temperature, the controller 10 immediately opens the drain valve 6 (step S3), so that the water inside the vaporizing container 1 is drained out of it through the drain pipe 8. Thus, the water that has attached to the interior wall surface of the vaporizing container 1 dries below the predetermined temperature. This minimizes the crystallization of scale.

Figure 3:
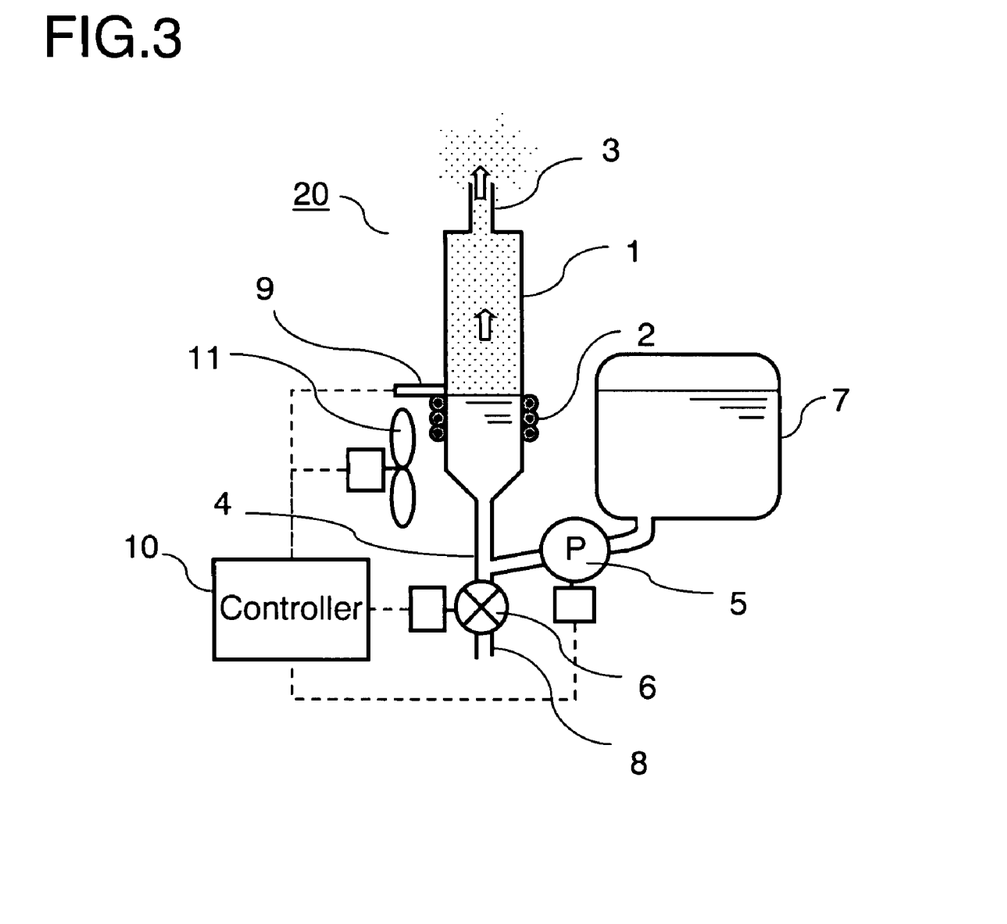
[FIG. 3] is an outline sectional view of the steam generating apparatus of a second embodiment of the invention.

Next, a second embodiment of the present invention will be described. FIG. 3 is an outline sectional view of the steam generating apparatus 20 of the second embodiment of the invention. In this figure, such members as are found also in the steam generating apparatus of the first embodiment described above are identified with common reference numerals, and their explanations will not be repeated. Here, a cooling fan 11 is additionally provided for cooling the vaporizing container 1 and the heater 2. The operation of the cooling fan 11 is controlled by the controller 10.

Figure 4:
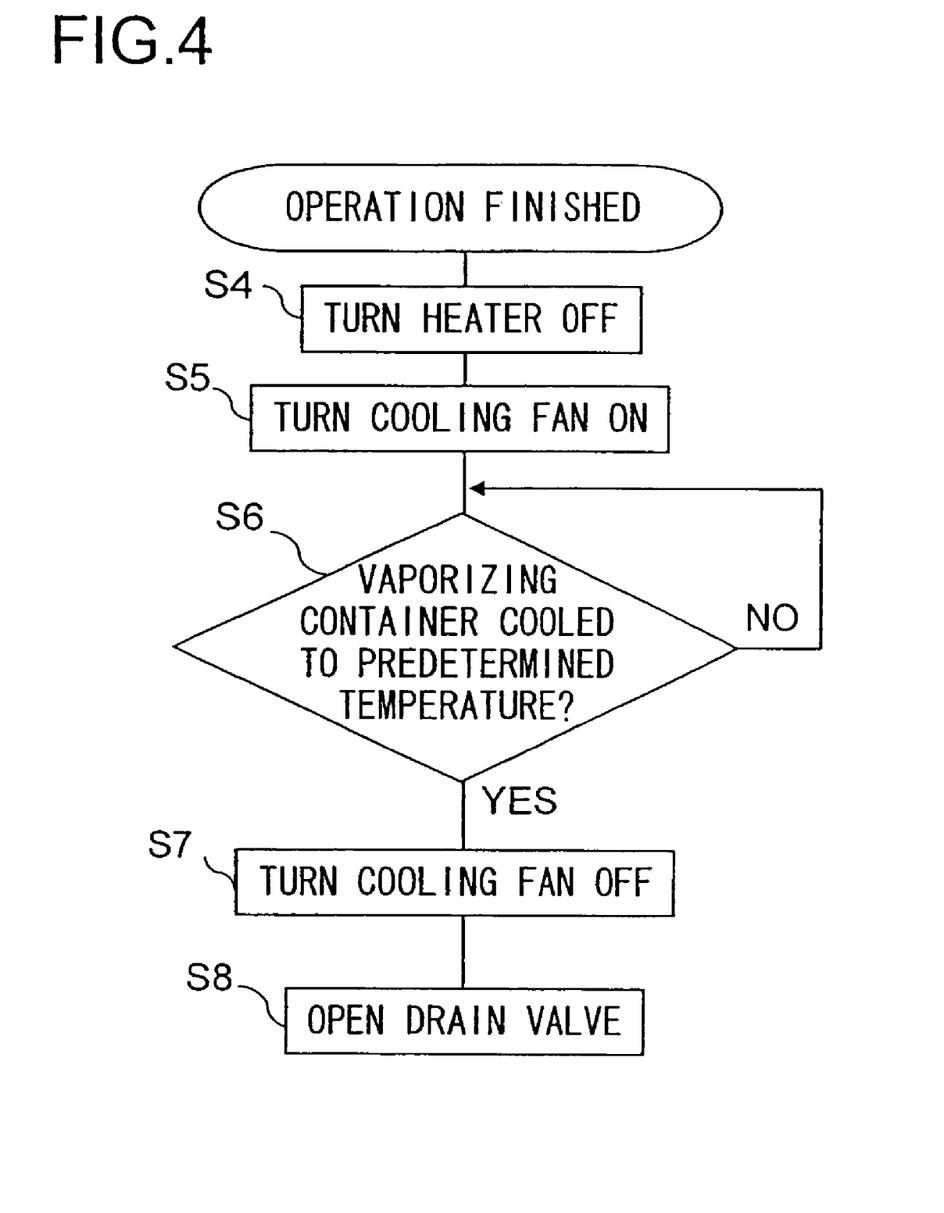
[FIG. 4] is a flow chart showing an example of the operation of the steam generating apparatus above.

Now, the operation of the steam generating apparatus 20 constructed as described above will be described with reference to the flow chart shown in FIG. 4. On completion of the steam generating operation, the heater 2 is turned off (step S4), and in addition the cooling fan 11 is started (step S5) so as to start to cool the vaporizing container 1 and the heater 2. Moreover, the monitoring of the temperature of the vaporizing container 1 by the thermistor 9 is started (step S6). The state as it currently is, i.e., with an ample amount of water present inside the vaporizing container 1, is maintained until the temperature of the vaporizing container 1 lowers to a predetermined temperature. Next, when the thermistor 9 detects the predetermined temperature, the controller 10 immediately stops the cooling fan 11 (step S7) and opens the drain valve 6 (step S8), so that the water inside the vaporizing container 1 is drained out of it through the drain pipe 8. Thus, the water that has attached to the interior wall surface of the vaporizing container 1 dries below the predetermined temperature. This minimizes the crystallization of scale. With the construction of this embodiment, the use of the cooling fan 11 helps reduce the time required up till the water is drained.

Next, a third embodiment of the present invention will be described. Here, the steam generating apparatus 20 has the same outline construction as shown in FIG. 3.

Figure 5:
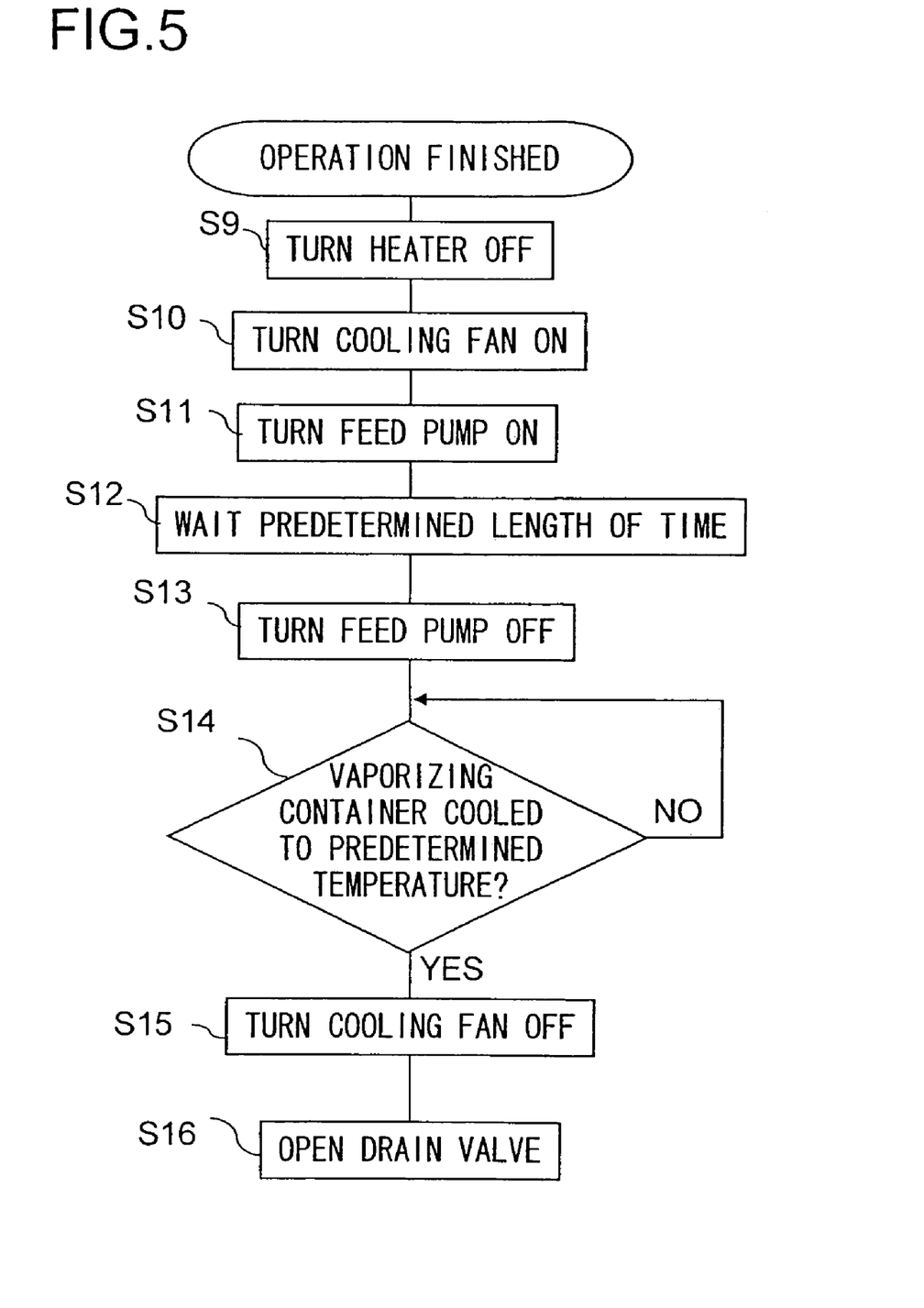
[FIG. 5] is a flow chart showing an example of the operation of the steam generating apparatus of a third embodiment of the invention.

Now, the operation of the steam generating apparatus 20 of this embodiment will be described with reference to the flow chart shown in FIG. 5. On completion of the steam generating operation, the heater 2 is turned off (step S9), and in addition the cooling fan 11 is started (step S10) to start to cool the vaporizing container 1 and the heater 2. Moreover, the feed pump 5 is started to start to feed additional water from the reservoir tank 7 into the vaporizing container 1 (step S11). Additional water is fed for a predetermined length of time to cool the vaporizing container 1 (steep S12). When the predetermined length of time has elapsed, the feed pump 5 is stopped (step S13), and the monitoring of the temperature of the vaporizing container 1 by the thermistor 9 is started (step S14). The state as it currently is, i.e., with an ample amount of water present inside the vaporizing container 1, is maintained until the temperature of the vaporizing container 1 lowers to a predetermined temperature. Next, when the thermistor 9 detects the predetermined temperature, the controller 10 immediately stops the cooling fan 11 (step S15) and opens the drain valve 6 (step S16), so that the water inside the vaporizing container 1 is drained out of it through the drain pipe 8. Thus, the water that has attached to the interior wall surface of the vaporizing container 1 dries below the predetermined temperature. This minimizes the crystallization of scale. In this embodiment, the feeding of additional water by the feed pump 5 helps further reduce the time required to cool the vaporizing container 1.

Figure 6:
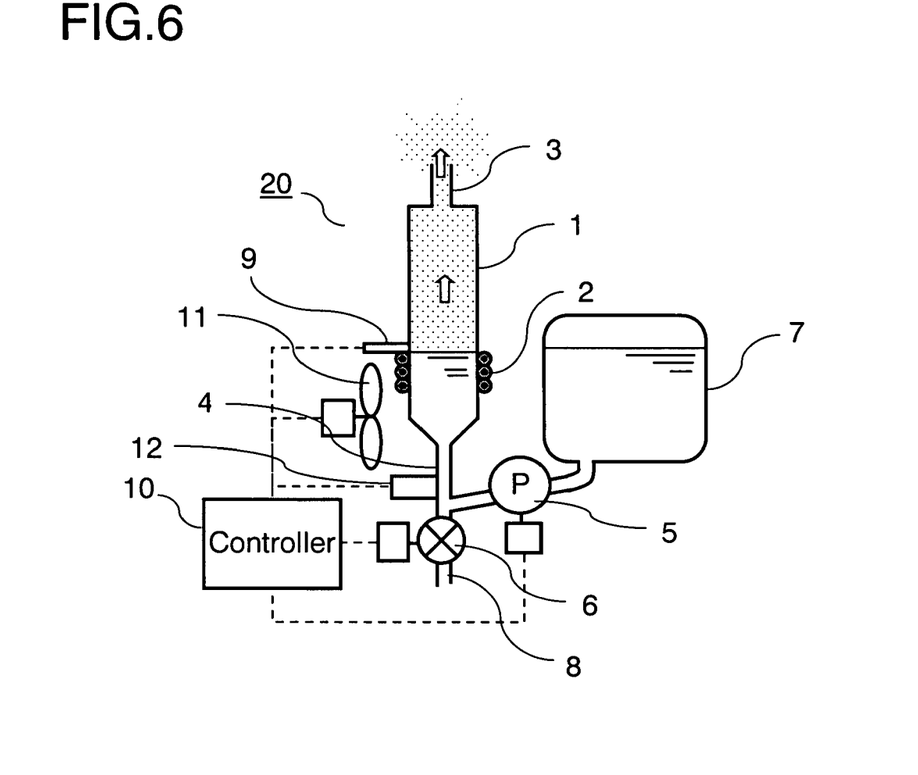
[FIG. 6] is an outline sectional view of the steam generating apparatus of a fourth embodiment of the invention.

Next, a fourth embodiment of the present invention will be described. FIG. 6 is an outline sectional view of the steam generating apparatus 20 of the fourth embodiment of the invention. In this figure, such members as are found also in the steam generating apparatuses of the first, second, and third embodiments described above are identified with common reference numerals, and their explanations will not be repeated. Here, a level sensor 12 is additionally provided that detects the water level inside the feed/drain pipe 4 and thereby permits the detection of the drainage state of the vaporizing container 1. This detection is performed by the controller 10.

Figure 7:
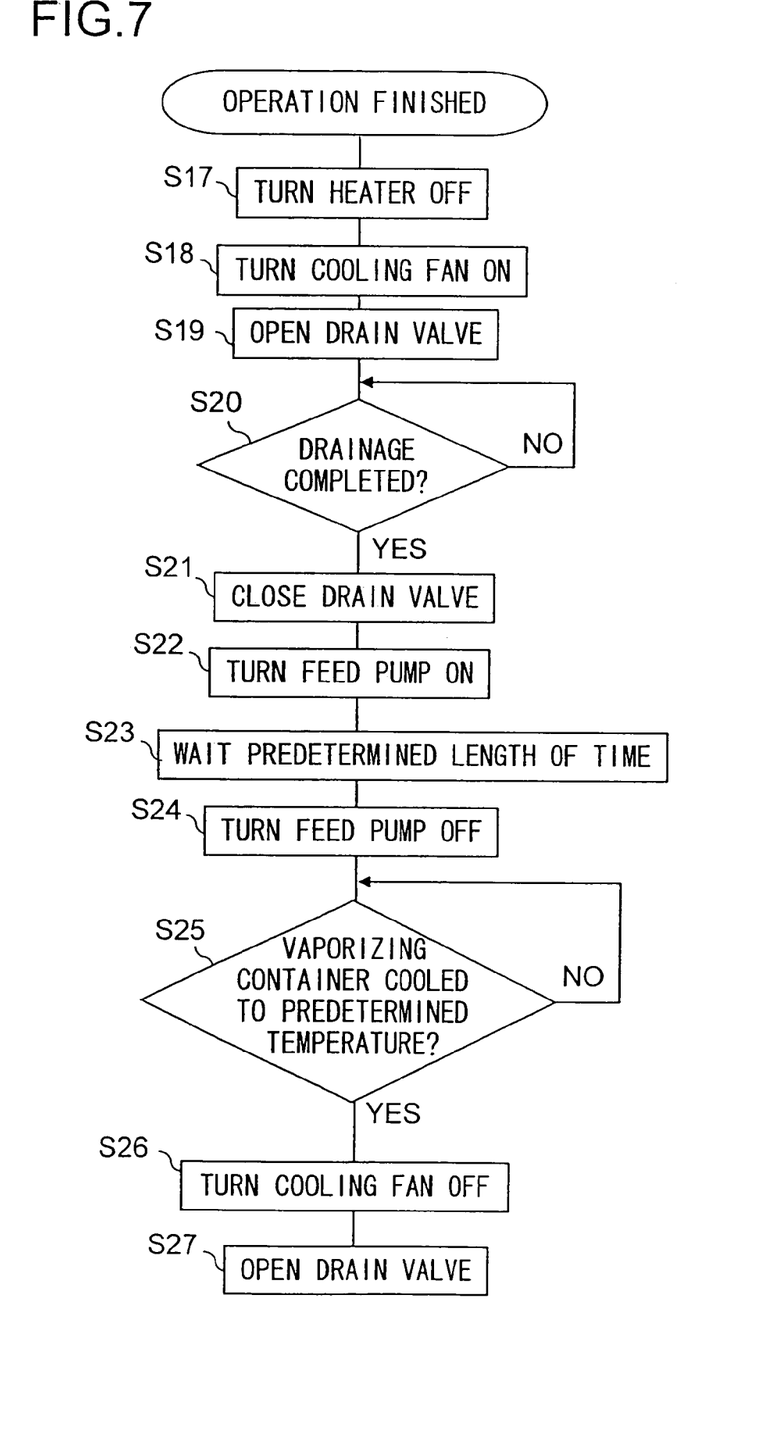
[FIG. 7] is a flow chart showing an example of the operation of the steam generating apparatus above.

Now, the operation of the steam generating apparatus 20 constructed as described above will be described with reference to the flow chart shown in FIG. 7. On completion of the steam generating operation, the heater 2 is turned off (step S17), and in addition the cooling fan 11 is started (step S18) to start to cool the vaporizing container 1 and the heater 2. Moreover, the drain valve 6 is opened to start to drain the water remaining inside the vaporizing container 1 out of it (step S19). The level sensor 12 monitors the water level inside the feed/drain pipe 4 (step S20), and, when it detects the completion of the drainage, the drain valve 6 is closed (step S21), and immediately the feed pump 5 is started to start to feed additional water from the reservoir tank 7 into the vaporizing container 1 (step S22). Additional water is fed for a predetermined length of time (step S23), and then the feed pump 5 is stopped (step S24). Now, the monitoring of the temperature of the vaporizing container 1 by the thermistor 9 is started (step S25). The state as it currently is, i.e., with an ample amount of water present inside the vaporizing container 1, is maintained until the temperature of the vaporizing container 1 lowers to a predetermined temperature. Next, when the thermistor 9 detects the predetermined temperature, the controller 10 immediately stops the cooling fan 11 (step S26) and opens the drain valve 6 (step S27), so that the water inside the vaporizing container 1 is drained out of it through the drain pipe 8. Thus, the water that has attached to the interior wall surface of the vaporizing container 1 dries below the predetermined temperature. This minimizes the crystallization of scale. In this embodiment, immediately after the completion of steam generating operation, first the hot water remaining inside the vaporizing container 1 is drained, and then additional water is fed into it by the feed pump 5. This helps reduce the time required to cool the vaporizing container 1.

Figure 8:
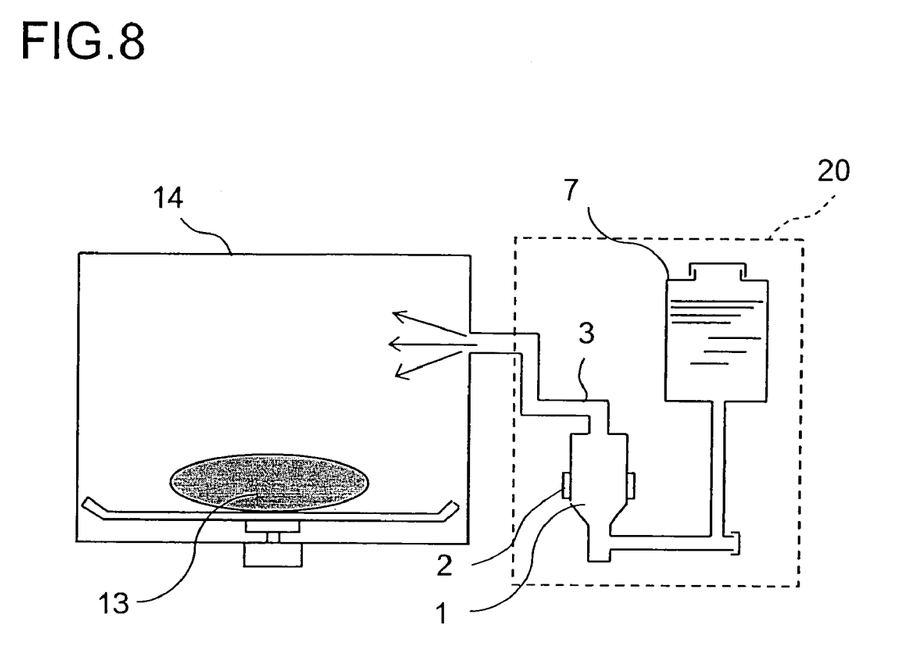
[FIG. 8] is an outline sectional view of a heating cooker incorporating a steam generating apparatus embodying the invention.

FIG. 8 shows the construction of a heating cooker incorporating a steam generating apparatus 20 embodying the invention. The water fed from the reservoir tank 7 into the vaporizing container 1 is converted into steam inside the vaporizing container 1, and is then fed into a heating compartment 14, in which a cooking target 13 is placed, to cook the cooking target 13.

INDUSTRIAL APPLICABILITY

Steam generating apparatuses according to the present invention find application in, for example, steam-heating cookers, i.e., heating cookers that cook a cooking target by application of heat thereto that is achieved by feeding steam into a heating chamber.

The invention claimed is:

1. A steam generating apparatus characterized by treatment of water remaining after completion of steam generation operation, comprising:
    a vaporizing container for keeping water in;
    heating means for heating the vaporizing container to generate steam;
    water feeding means for feeding water into the vaporizing container;
    draining means for draining water out of the vaporizing container;
    temperature detecting means for detecting temperature of the vaporizing container;
    controlling means that, after completion of steam generating operation, brings the heating means into a non-operating state and that, when the temperature detecting means detects that the temperature of the vaporizing container has lowered to a predetermined temperature or less, makes the draining means operate.

2. The steam generating apparatus of claim 1, further comprising:
    a cooling fan for forcibly cooling the vaporizing container.

3. A heating cooker comprising the steam generating apparatus of claim 1.

4. A heating cooker comprising the steam generating apparatus of claim 2.

5. A heating cooker comprising the steam generating apparatus of claim 1.

6. The steam generating apparatus of claim 1 wherein said draining means is located at a bottom of the vaporizing container.

7. A steam generating apparatus characterized by treatment of water remaining after completion of steam generating operation, comprising:
    a vaporizing container for keeping water in;
    heating means for heating the vaporizing container to generate steam;
    water feeding means for feeding water into the vaporizing container;
    draining means for draining water out of the vaporizing container;
    temperature detecting means for detecting temperature of the vaporizing container;
    controlling means
    that, after completion of steam generation operation, brings the heating means into a non-operating state and makes the water feeding means operate and
    that, when the temperature detecting means detects that the temperature of the vaporizing container has lowered to a predetermined temperature or less, brings the water feeding means into a non-operating state and makes the draining means operate.

8. The steam generating apparatus of claim 7,
    wherein, before making the water feeding means operate, the controlling means drains water inside the vaporizing container by making the draining means operate.

9. The steam generating apparatus of claim 8, further comprising:
    a cooling fan for forcibly cooling the vaporizing container.

* * * * *

UNITED STATES PATENT AND TRADEMARK OFFICE
CERTIFICATE OF CORRECTION

PATENT NO. : 7,509,034 B2 Page 1 of 1
APPLICATION NO. : 10/570305
DATED : March 24, 2009
INVENTOR(S) : Tetsuya Kadoma et al.

It is certified that error appears in the above-identified patent and that said Letters Patent is hereby corrected as shown below:

On the title page item [54] and col. 1, line 1:

Please change "Production" to --Producing--.

Signed and Sealed this

Eighth Day of September, 2009

David J. Kappos
*Director of the United States Patent and Trademark Office*